Dec. 22, 1964
G. E. OWEN, JR
3,162,730
STEREOPHONIC AMPLIFIER CIRCUIT PROVIDING IMPROVED LOW FREQUENCY RESPONSE
Original Filed Aug. 11, 1959
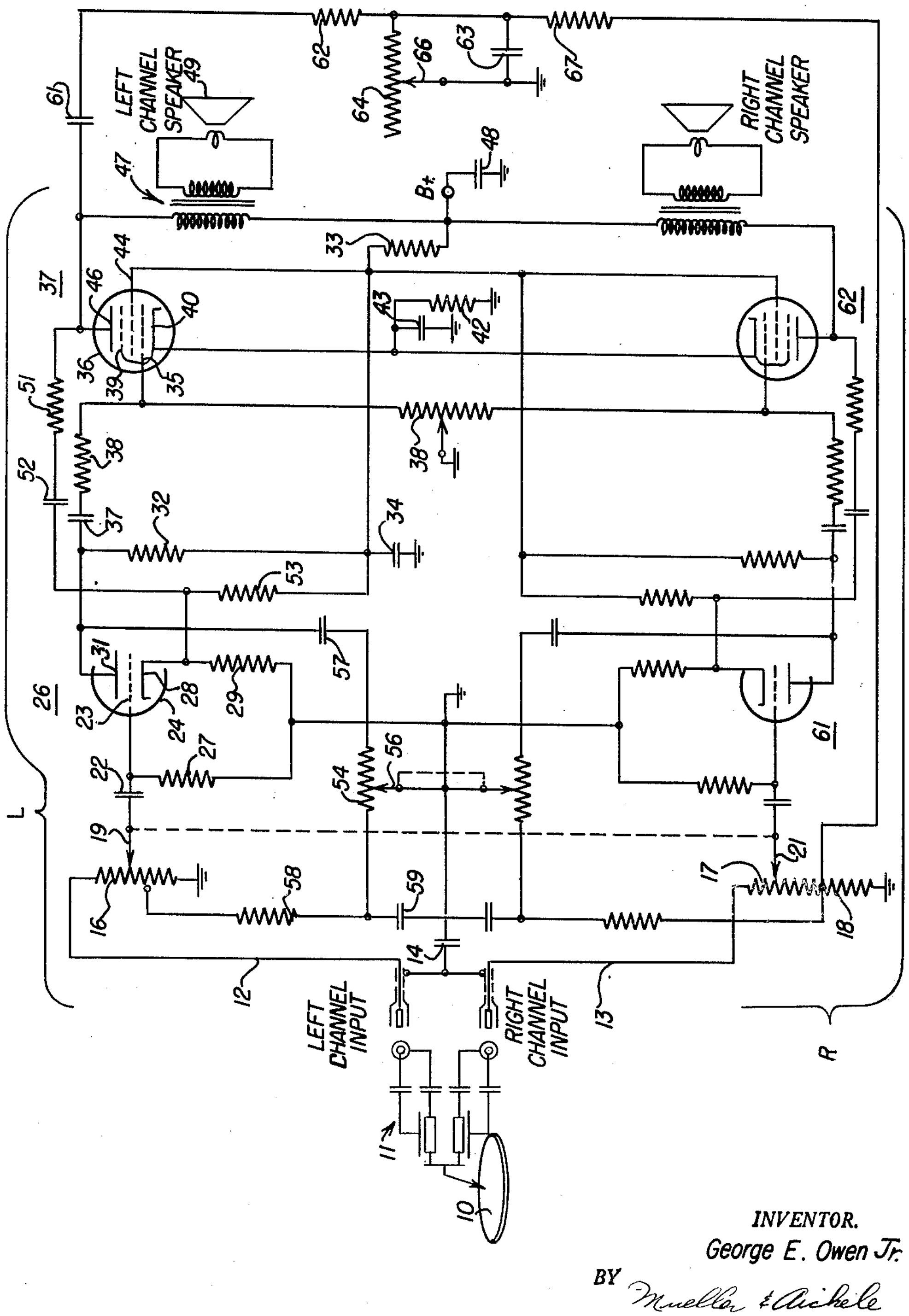
INVENTOR.
George E. Owen Jr.
BY Mueller & Aichele
Attys.

United States Patent Office 3,162,730
Patented Dec. 22, 1964

3,162,730
STEREOPHONIC AMPLIFIER CIRCUIT PROVIDING IMPROVED LOW FREQUENCY RESPONSE

George Edwin Owen, Jr., Melrose Park, Ill., assignor to Motorola, Inc., Chicago, Ill., a corporation of Illinois
Continuation of application Ser. No. 833,098, Aug. 11, 1959. This application Dec. 20, 1961, Ser. No. 161,345
5 Claims. (Cl. 179—100.4)

This invention relates generally to stereophonic signal-translating apparatus and more particularly to an improved system for enhancing bass tones in such apparatus. This is a continuation of my copending application Serial No. 833,098, filed August 11, 1959.

In order to provide inexpensive stereophonic sound reproduction equipment such as disk phonograph record players and the like, it is necessary to reduce both the number and size of components and to simplify the circuitry. For example, in the more expensive stereophonic equipment, separate large speakers, commonly known as woofers, are furnished in addition to the minimum of a separate speaker for each channel to reproduce the low frequencies. Such woofers are expensive and require more power amplifying units to drive them, and therefore they are often dispensed with in low cost stereophonic units. If cost reduction can be accomplished without sacrificing the frequency range and faithfulness of response of such equipment, the more desirable it will be. It is well known, however, that fewer and less expensive components will ordinarily reduce the breadth of the reproduced frequency band, especially at the lower end of the frequency scale. In spite of this fact, it is still possible to achieve satisfactory stereophonic sound effects with such equipment since practical experimentation has shown that the bass frequencies (below about 250 cycles) do not in themselves contribute significantly to the stereophonic effect. It is sufficient that the equipment be capable of reproducing frequencies generally in the range of 250 to 1500 cycles since this general range of frequencies best promotes the stereo effect. Of course frequencies above and below this range are also important for obtaining overall high fidelity or faithful reproduction.

Accordingly, it is an object of the present invention to provide new and improved stereophonic audio signal-translating apparatus which is low in cost yet wherein the low-frequency response may be substantially improved over that ordinarily found in an inexpensive system.

Another object is to provide improved stereophonic amplifying apparatus in which the low frequency amplification may be adjustably boosted without the addition of separate speakers or expensive components especially designed for reproduction of low audio frequencies.

A feature of the present invention is the provision in multiple channel stereophonic amplifying apparatus of a low pass filter coupled between the output of an amplifying stage for one of the channels and an input circuit of an amplifying stage for another channel to increase the bass signal level of the system.

Another feature is the provision in dual channel stereophonic apparatus having an amplifying system for each channel of a variable frequency selective network non-regeneratively coupled between an output circuit of one of the amplifying system and an input circuit of the other amplifying system to provide a controllable increase in the overall low frequency response of the apparatus.

In the accompanying drawing FIGURE 1 is a schematic diagram which illustrates a bass boost circuit arrangement in accordance with the invention.

In brief, a system is provided for boosting the bass output of one amplifier in multiple channel stereophonic amplifying apparatus to improve the low frequency response of the entire apparatus. In a dual channel system, this is achieved by coupling a shunt circuit between an output circuit in the first channel amplifier and a common reference potential for the left and right channel signals. One leg of the shunt circuit includes a low pass capacitive network for bypassing the medium and high frequency components of the first channel signal to the reference potential. These components may be of the order of 200–300 cycles per second and above. This network may include a parallel connected variable resistor so that the bass boost effect can be controlled to suit the listener. Another leg of the shunt circuit includes a resistive network for coupling the selected bass signals from the first channel amplifier to the second channel amplifier. An appropriate phased input circuit of the second channel amplifier is connected to this resistive leg, and usually at a matched amplitude point therealong, so that the substantially in-phase first channel bass signals boost the bass signals being applied to the second channel amplifier.

Referring now to FIG. 1, a conventional dual channel stereophonic phonograph is illustrated which has an amplifier L and associated speaker for reproducing left channel audio intelligence and another amplifier R and associated speaker for reproducing right channel audio intelligence. The "right" and "left" signals are derived from a disc type phonograph record 10, such as the so-called 45/45 stereophonic record now on the market, by a dual channel audio signal source such as the stereophonic pickup cartridge 11. A left channel output lead therefrom supplies left channel audio intelligence to the left channel input lead 12 of amplifier L. Right channel audio intelligence is fed from the right channel output lead of cartridge 11 to the right channel input lead 13 of amplifier R. Both input sockets containing leads 12 and 13 are grounded for alternating current by the common capacitor 14 connected between the respective socket shields and a common reference potential. The outer surfaces of the respective cartridge jacks provide the return terminals to complete the cartridge output circuit.

In the respective input circuits of the phonograph amplifiers, a potentiometer 16 is connected across the output terminals of the left channel audio signal source while another potentiometer 17 is connected across the output terminals of the right channel audio signal source. The variable taps 19 and 21 of potentiometers 16 and 17 are ganged for operation as a single volume control to tap off input signals developed across the respective potentiometers. Variable tap 19 is connected through a capacitor 22 to the control grid 23 of triode 24, here shown as half of a double triode. Triode 24 is connected as a voltage amplifier stage 26, grid 23 being returned to the reference potential through a grid-leak resistor 27. The cathode 28 of triode 23 is connected to the reference potential through a cathode bias resistor 29 and the anode 31 is connected through a load resistor 32 and isolating resistor 33 to a source of direct current indicated as B+. The left channel amplified audio signals are developed across load resistor 32, and the junction of resistors 32 and 33 is bypassed to the reference potential for these signals by capacitor 34.

The output of voltage amplifier stage 26 is coupled in a conventional manner to the control grid 35 of a pentode 36 through coupling capacitor 37 and suppressor resistor 38. Pentode 36 is connected as a power amplifier stage 37 with the control grid 35 being returned to the reference potential through one side of an in-common connected balance potentiometer 38, each side thereof serving as an adjustable grid-leak resistor. Suppressor grid 39 and cathode 40 of the pentode 36 are connected to the reference potential through a cathode bias resistor 42 and bypass capacitor 43, resistor 42 and capacitor 43 also being connected in-common between the two amplifiers to thereby serve the same function in the circuit of amplifier R. The screen grid 44 of pentode 36 is connected to the source of B+ by the screen resistor 33 and is bypassed to the reference potential by the capacitor 34, both also being in-common connected between the left and right amplifier circuits.

The anode 46 of tube 36 is connected through the primary winding of output transformer 47 to the source of B+ potential and is then bypassed to the reference potential by capacitor 48 connected to the B+ source. To complete the left channel system, the secondary winding of output transformer 47 is connected to drive the coil of speaker 49 wherein the left channel signal is converted to audible sound waves.

A small portion of the amplifier energy in the plate circuit of amplifier stage 37 is fed back to the cathode circuit of the preceding amplifier stage 26 to provide negative feedback to improve frequency response and to cancel out any distortion generated in stage 37. This is accomplished in a conventional manner by connecting a shunt circuit, consisting of a resistor 51, a capacitor 52, another resistor 53 and bypass capacitor 34 all in series, between the junction of plate 46 with the primary transformer 47 and the reference potential. The cathode 28 of tube 24 is then connected to the junction of resistor 53 and capacitor 52 so that feedback voltage in phase opposition is applied to the input circuit of amplifier stage 26.

It will be evident from the schematic diagram of FIG. 1 that the right channel amplifier R is a duplicate of amplifier L, the two amplifiers containing symmetrical circuitry and being mounted on the same chassis.

The operation of the symmetrical amplifiers L and R is entirely conventional and will be readily understood from the foregoing description by those skilled in the art. Briefly, and without considering for the moment further structure of the invention to be subsequently described, an audio signal having frequency components extending over a given audio range and characteristic of the left side of a sound source is supplied from the left channel lead of a stereophonic sound source, such as the cartridge 11, and is impressed across the input circuit of amplifier stage 26 of amplifier L. The amplifier stages 26 and 37 of amplifier L are designed to amplify in a standard manner substantially all of the frequency components of the audio range. The amplifier audio signal is developed across the primary winding of output transformer 47 to induce a signal in the secondary winding which is then reproduced by the speaker 49. The operation of the right channel amplifier R with respect to the right channel intelligence applied thereto is the same as the left channel amplifier L.

As an additional feature of the particular phonograph described, the left channel amplifier is provided with a tone control circuit including a potentiometer 54 having a variable tap 56 connected to the reference potential. One end of potentiometer 54 is connected through frequency selective capacitor 57 to the anode 31 of tube 24 while the other end of the potentiometer is connected through resistor 58 to a fixed tap provided on potentiometer 16. The portion of the potentiometer 54 between variable tap 56 and resistor 58 is shunted by capacitor 59. Frequency response of the left channel system may be adjusted by moving the tap 56. Movement to the left will increase the treble response of stage 26, since an increasing amount of resistance is placed in series with capacitor 57 while the effect of capacitor 59 in providing bass response for this stage is decreased. The variable tap 56 of potentiometer 54 is ganged with an identical tone control circuit connected across a voltage amplification stage 61 in amplifier R for simultaneous tone control of both channels.

As was previously noted, the circuitry of the right channel system is symmetrical with the circuitry of the left channel system, permitting some of the components to be connected in common between the systems. Thus the balance control potentiometer 38 functions as a grid-leak resistor in each of the input circuits of the power amplification stages 37 and 62 of the respective left and right channel amplifiers. By moving the variable tap of this potentiometer, a simultaneous and inverse change in the input voltages applied to the respective amplification stages may be produced to compensate for any signal imbalanced between the input circuits.

A controlled bass boost is achieved by adding further circuitry to the above described stereophonic sound reproduction system. In the disclosed embodiment of the invention this is accomplished by connecting one side of a blocking capacitor 61 to the output circuit of power amplification stage 37 at the junction of plate 46 and the primary winding of transformer 47, the other side of capacitor 61 being series connected to resistor 62. Resistor 62 in turn is connected to the reference potential through two shunt circuits. The first shunt circuit consists of a low-pass filter network including a capacitor 63 parallel connected with a variable resistor 64, the latter being manually adjustable by means of tap 66. The second shunt circuit contains a coupling resistor 67 connected between the junction of the variable low-pass filter network with resistor 62 and the tap which defines a portion 18 of potentiometer 17.

In operation, the bass boost circuit applies a portion of the low-frequency components in the amplified left channel signal from an output circuit of one of the amplifier stages in amplifier L to an input circuit of one of the amplifier stages in amplifier R. When the connection between the amplifiers is made from the output circuit of the final amplifying stage, a signal of relatively large amplitude is available. As previously described, such a signal, having left channel frequency components extending over a given audio range, is developed across the primary winding of the output transformer 47. This signal is coupled to the bass boost circuit by capacitor 61, which has a large value of capacitance so as not to eliminate the low frequency components of the signal. Capacitor 61 also isolates or blocks the passage of direct current from the output circuit to the bass boost circuit. In order to limit the amount of signal current in the bass boost circuit to a small proportion of that through the primary of the output transformer 47, a relatively large resistor 62 is series connected to capacitor 61. Thus, even when the subsequent portions of the bass boost circuit are completely bypassed by moving the variable tap 66 all the way to the right on resistor 64, only a small portion of the output current will flow through capacitor 61 and resistor 62.

Considering now the operation of the remaining portions of the bass boost circuit, when the variable tap 66 is in the far right position the entire range of component frequencies coupled through capacitor 61 from the left channel output will be non-selectively shunted through tap 66 to the reference potential. This setting of the tap will thus correspond to the minimum effect position of the bass boost control. As the tap is moved to the left more resistance is added in series with resistor 62 and in parallel with capacitor 63. Since the reactance of capacitor 63 varies inversely with frequency while resistor 64 remains essentially non-selective to the band of frequencies, most of the middle and high frequency components will be bypassed to the reference potential by the capacitive leg of the circuit. The value of capacitance of capacitor 63 will determine the lower cut-off characteristic for these frequency components, which generally are on the order of 200–300 cycles per second and above. The voltage drop for the relatively low frequency components, generally those of 200–300 cycles and below, will now be divided between resistor 64 and resistor 62. Thus, the increase in the voltage drop across resistor 64 will be confined primarily to the low frequency or bass components in the audio range. These components are then developed over a voltage divider network consisting of the series resistor 67 and potentiometer portion 18 connected between the junction of resistor 62 with resistor 64 and the reference potential. Since the input circuit of voltage amplifier stage 61 in amplifier R is connected across potentiometer 17 which includes the portion 18, the low frequency signals thus selected from amplifier L will be applied to the input of amplifier R.

The amplitude range of the left channel low frequency components applied to the input of stage 61 is determined by the resistances of resistor networks 62, 64, 67 and 18. For maximum bass boost a typical design would limit the amplitude of these frequencies to about the same order of amplitude found in the right channel low frequency components derived from the cartridge 11 and developed across the input of stage 61 or other input circuits selected for the connection. Resistor 67 also serves to substantially isolate the input signal of stage 61 from capacitor 63 to prevent distortion of the right channel middle and high frequency components.

In the disclosed embodiment of the invention it has been found that components of the following types and values provide satisfactory results:

| | |
|---|---|
| Triode tubes in stages 26 and 61 | Type 12AX7A. |
| Pentode tubes in stages 37 and 62 | Type 35C5. |
| Capacitor 61 | .01 microfarad. |
| Resistor 62 | 400,000 ohms. |
| Capacitor 63 | .001 microfarad. |
| Resistor 64 | 1 megohm. |
| Resistor 67 | 100,000 ohms. |
| Potentiometer 17 | 1 megohm. |
| Resistance of portion 18 of potentiometer 17 | 330,000 ohms. |

It is to be understood that the above tube types and circuit component values are not intended to limit the invention as variations therefrom will occur to those skilled in the art without departing from the inventive concepts disclosed by the above described structure.

It is to be noted that the left channel low-frequency components in the output of the second stage of amplifier L and the right channel low-frequency components applied to the input circuit of the first stage in amplifier R will be essentially in phase, and therefor no noticeable subtraction or distortion will occur between these mixed signals. This is due to the fact that in stereophonic reproduction phase and amplitude differences do not become significant until the middle and relatively high frequency audio signals are reached. Thus, a stereophonic phonograph may be provided with an adjustable bass boost circuit in accordance with the invention without deteriorating the low-frequency response of amplifier R.

Since the invention is primarily intended for addition to inexpensive stereophonic reproducing systems, a marked increase in the faithfulness of reproduction will be noted as more of the left channel bass signal is applied to a right channel input circuit. As was explained previously, the less expensive the system, the narrower the range of undistorted frequency reproduction. By adding a predetermined portion of the amplified left channel bass signals, correctly phased, to the right channel signal applied to a selected input circuit of amplifier R, an increased amount of bass will be developed in this applied signal. These boosted bass frequencies will then be amplified in amplifier R to produce an output which is actually distorted in favor of the low frequencies on the right side of the phonograph. However, due to the nondirectional characteristics of the low frequencies, the listener will be unable to detect this intentional amplitude imbalance between the left and right systems and the overall effect will be stereophonic sound reproduction of higher fidelity.

The attenuation of the low frequency components in both the left and right systems caused by sacrificing the more expensive components in order to maintain low cost will thus be effectively compensated for by the circuit arrangement of the invention. To produce an equivalent output having the same frequency response without improving the component quality of the set would require another stage of amplification in one of the systems. Thus the cost of a tube and attendant components is saved by the simple circuitry of the invention.

From the foregoing description it will be apparent that similar results could be obtained from the above circuitry or its equivalent by coupling an appropriate output stage of the right channel system to an appropriate input stage of the left channel system without thereby deviating from the inventive concept of the disclosed embodiment.

I claim:

1. Stereophonic signal reproducing apparatus including in combination, first and second amplifying means having respective input and output circuits, means for applying stereophonic signals respectively to said input circuits of said first and second amplifying means, first and second sound reproducing means directly connected to said output circuits of said first and second amplifying means respectively for audibly reproducing the stereophonic signals, low pass filter means coupled from said output circuit of said first amplifying means to said input circuit of said second amplifying means, thereby increasing the low frequency output level of said apparatus beyond the reproduction provided by the frequency response characteristic of said first and second amplifying means.

2. Stereophonic signal reproducing apparatus including in combination, first and second amplifying means having substantially the same frequency response characteristic, said amplifying means having respective input and output circuits, means for applying stereophonic signals respectively to said input circuits of said first and second amplifying means, first and second sound reproducing means directly connected respectively to said output circuits of said first and second amplifying means for audibly reproducing the stereophonic signals, low pass filter means coupled from said output circuit of said first amplifying means to said input circuit of said second amplifying means thereby increasing the low frequency output level of said apparatus beyond the reproduction provided by the frequency response characteristic of said first and second amplifying means.

3. Stereophonic signal reproducing apparatus including in combination, a multiple channel audio signal source, first and second amplifying means connected to said source, first and second sound reproducing means directly connected to said first and second amplifying means respectively for audibly reproducing the stereophonic signals, a variable low pass filter network coupled from a point between said first amplifying means and said first sound reproducing means to a point between said source and said second amplifying means so that a portion of a low frequency signal from said source is amplified by both said first and said second amplifying means to increase the low frequency output level of said apparatus beyond the reproduction provided by the frequency response characteristic of said first and second amplifying means.

4. Stereophonic signal reproducing apparatus including in combination, a dual channel audio signal source, first and second amplifying means connected to said source, first and second sound reproducing means directly connected to said first and second amplifying means respectively for audibly reproducing the stereophonic signals, a variable low pass filter coupled from a point between said first amplifying means and said sound reproducing means to a point between said source and said second amplifying means, said filter having variable impedance means and capacitance means coupled in parallel, so that a variable low frequency signal from said source may be amplified by both said first and second amplifying means to increase the low frequency output level of said apparatus beyond the reproduction provided by the frequency response characteristic of said first and second amplifying means, said variable impedance means forming an adjustable control for determining the amount of increase in the low frequency output level of said apparatus.

5. Stereophonic reproducing apparatus including in combination, first and second driver amplifier devices having substantially the same frequency response and having respective input and output circuits, phonograph pickup means for applying stereophonic signals respectively to said input circuits of said first and second driver amplifier devices, first and second power amplifier devices having substantially the same frequency response and having respective input and output circuits, said output circuits of said first and second driver amplifier devices being directly connected to said input circuits of said first and second power amplifier devices respectively, first and second sound reproducing means directly connected to said output circuits of said first and second power amplifier devices respectively for audibly reproducing the stereophonic signals, a variable low pass filter coupled from the output circuits of said first power amplifier device to the input circuit of said second driver amplifier device, said filter having variable impedance means and capacitance means coupled in parallel so that a variable low frequency signal from said source may be amplified by all of said devices to increase the low frequency output level of said apparatus beyond the reproduction provided by the frequency response characteristics of said devices, said variable impedance means forming an adjustable control for determining the amount of increase in the low frequency output level of said apparatus.

References Cited in the file of this patent

UNITED STATES PATENTS 2,876,299 Robins ------------------ Mar. 3, 1959

FOREIGN PATENTS 1,051,525 Germany --------------- Feb. 26, 1959